(12) United States Patent
Suzuki

(10) Patent No.: US 9,376,107 B2
(45) Date of Patent: Jun. 28, 2016

(54) VEHICLE TRAVEL CONTROL APPARATUS AND VEHICLE TRAVEL CONTROL METHOD

(71) Applicant: NISSAN MOTOR CO., LTD., Yokohama-shi, Kanagawa (JP)

(72) Inventor: Taku Suzuki, Isehara (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/760,331

(22) PCT Filed: Dec. 19, 2013

(86) PCT No.: PCT/JP2013/007491
§ 371 (c)(1),
(2) Date: Jul. 10, 2015

(87) PCT Pub. No.: WO2014/108968
PCT Pub. Date: Jul. 17, 2014

(65) Prior Publication Data
US 2015/0353079 A1 Dec. 10, 2015

(30) Foreign Application Priority Data
Jan. 11, 2013 (JP) .................................. 2013-003883

(51) Int. Cl.
*B60W 30/02* (2012.01)
*B60W 10/18* (2012.01)
(Continued)

(52) U.S. Cl.
CPC .............. *B60W 30/02* (2013.01); *B60T 8/1755* (2013.01); *B60W 10/18* (2013.01); *B60W 10/20* (2013.01); *B60W 30/045* (2013.01); *B62D 5/001* (2013.01); *B62D 5/003* (2013.01); *B62D 6/003* (2013.01); *B60T 2260/02* (2013.01);
(Continued)

(58) Field of Classification Search
None
See application file for complete search history.

(56) References Cited

U.S. PATENT DOCUMENTS 5,228,757 A * 7/1993 Ito ......................... B60T 8/1755
303/146
6,155,655 A * 12/2000 Matsuno ............... B60T 8/1755
303/140
(Continued)

FOREIGN PATENT DOCUMENTS

DE 10356509 A1 7/2005
JP 06-115418 A 4/1994
(Continued)

*Primary Examiner* — Yonel Beaulieu
*Assistant Examiner* — Krishnan Ramesh
(74) *Attorney, Agent, or Firm* — Young Basile Hanlon & MacFarlane, P.C.

(57) ABSTRACT

In order to suppress misoperation of stability control resulting from neutral position displacement, between the steering input mechanism configured so that a steering shaft rotates in accordance with the steering manipulation of the driver and a turning output mechanism configured so that wheels are turned with the rotation of the pinion shaft, a clutch is inserted that disconnectably joins the steering shaft and the pinion shaft. A first turning motor and a second turning motor are provided that can give a turning force to the turning output mechanism, and the first turning motor and the second turning motor are driven and controlled so that a turning angle in accordance with the steering manipulation by the driver is realized while the clutch is disconnected. When neutral position displacement occurs of the neutral position of the steering shaft and the neutral position of the pinion shaft, the stability control is suppressed.

6 Claims, 7 Drawing Sheets

(51) Int. Cl.
*B60W 10/20* (2006.01)
*B60W 30/045* (2012.01)
*B60T 8/1755* (2006.01)
*B62D 5/00* (2006.01)
*B62D 6/00* (2006.01)

(52) U.S. Cl.
CPC ........ *B60T 2260/04* (2013.01); *B60W 2510/20* (2013.01); *B60W 2710/18* (2013.01)

(56) References Cited

U.S. PATENT DOCUMENTS

| | | | | |
|---|---|---|---|---|
| 6,778,890 | B2* | 8/2004 | Shimakage | B62D 15/025 |
| | | | | 180/443 |
| 7,526,372 | B2* | 4/2009 | Tsutsumi | B62D 5/003 |
| | | | | 180/405 |
| 7,558,662 | B2* | 7/2009 | Yamaguchi | B60T 8/17552 |
| | | | | 180/412 |
| 7,698,032 | B2* | 4/2010 | Matsumoto | B60T 8/17557 |
| | | | | 180/170 |
| 2003/0078712 | A1* | 4/2003 | Shimakage | B62D 1/286 |
| | | | | 701/41 |
| 2004/0113486 | A1* | 6/2004 | Koga | B60T 7/107 |
| | | | | 303/20 |
| 2005/0113999 | A1* | 5/2005 | Tange | B60T 8/17557 |
| | | | | 701/41 |
| 2005/0125153 | A1* | 6/2005 | Matsumoto | B60T 8/17557 |
| | | | | 701/300 |
| 2006/0149445 | A1 | 7/2006 | Suzumura et al. | |
| 2006/0190151 | A1* | 8/2006 | Tsutsumi | B62D 5/003 |
| | | | | 701/41 |
| 2007/0032937 | A1* | 2/2007 | Yamaguchi | B60T 8/17552 |
| | | | | 701/70 |
| 2015/0183428 | A1* | 7/2015 | Nishigaki | B60T 8/1755 |
| | | | | 701/41 |

FOREIGN PATENT DOCUMENTS

| | | |
|---|---|---|
| JP | 2002-178943 A | 6/2002 |
| JP | 2006-182249 A | 7/2006 |
| JP | 2011-005933 A | 1/2011 |

* cited by examiner

VEHICLE TRAVEL CONTROL APPARATUS AND VEHICLE TRAVEL CONTROL METHOD

CROSS REFERENCE TO RELATED APPLICATION

The entire contents of the Japanese Patent Application No. 2013-003883 (filed on Jan. 11, 2013) in which the priority right of the present patent application is claimed are herein incorporated by reference.

TECHNICAL FIELD

The present invention relates to vehicle travel control apparatuses and methods to control vehicle travel.

BACKGROUND

JP 2011-5933 A describes a steering-by-wire technology, including a backup clutch. Steering-by-wire controls the turning angle of a wheel in accordance with the steering angle of the steering wheel in the state of clutch disengaged, and engages the clutch when the ignition is turned OFF.

When the ignition is turned OFF and if the steering manipulation is performed before the actual engagement of the clutch, the relationship between the steering angle and the turning angle changes, and so position displacement (neutral position displacement) may occur. In this case, after turning the ignition ON again, then the relationship between the steering angle and the turning angle has to be corrected. However, although the driver tries to drive the vehicle straight ahead, for example, the steering angle may be larger than 0 before the correction of the relationship between the steering angle and the turning angle. This may cause the misoperation of braking force control to make the turning behavior of the vehicle agree with the target turning behavior.

SUMMARY

The present invention aims to suppress misoperation of the braking force control resulting from position displacement.

A steering control apparatus according to one embodiment of the present invention detects turning behavior of a vehicle, sets target turning behavior of the vehicle, and when deviation between the turning behavior and the target turning behavior is larger than a predetermined threshold, activates braking force control to control travelling in accordance with the deviation. Between a steering mechanism configured to be steered by a driver and a turning mechanism configured to turn a wheel, a clutch is inserted, configured to join the steering mechanism and the turning mechanism disconnectably. A turning actuator configured to be able of giving a turning force to the turning mechanism is provided, and a target turning angle of the wheel is set in accordance with steering by the driver in the state of the clutch disconnected, and the turning actuator is driven and controlled in accordance with the target turning angle. Then turning angle of the wheel is detected, and when position displacement occurs so that the target turning angle and the turning angle are different, the threshold to activate the braking force control is set larger.

According to the present invention, if position displacement occurs, that is, in the state where the turning behavior of a vehicle and the target turning behavior cannot be compared appropriately, a threshold to activate the braking force control is made larger, meaning that braking force control is suppressed. This can suppress the misoperation of the braking force control resulting from position displacement.

DETAILED DESCRIPTION OF THE EMBODIMENTS

Embodiments of the present invention will now be described with reference to the drawings.

Embodiment 1

Configuration

Figure 1:
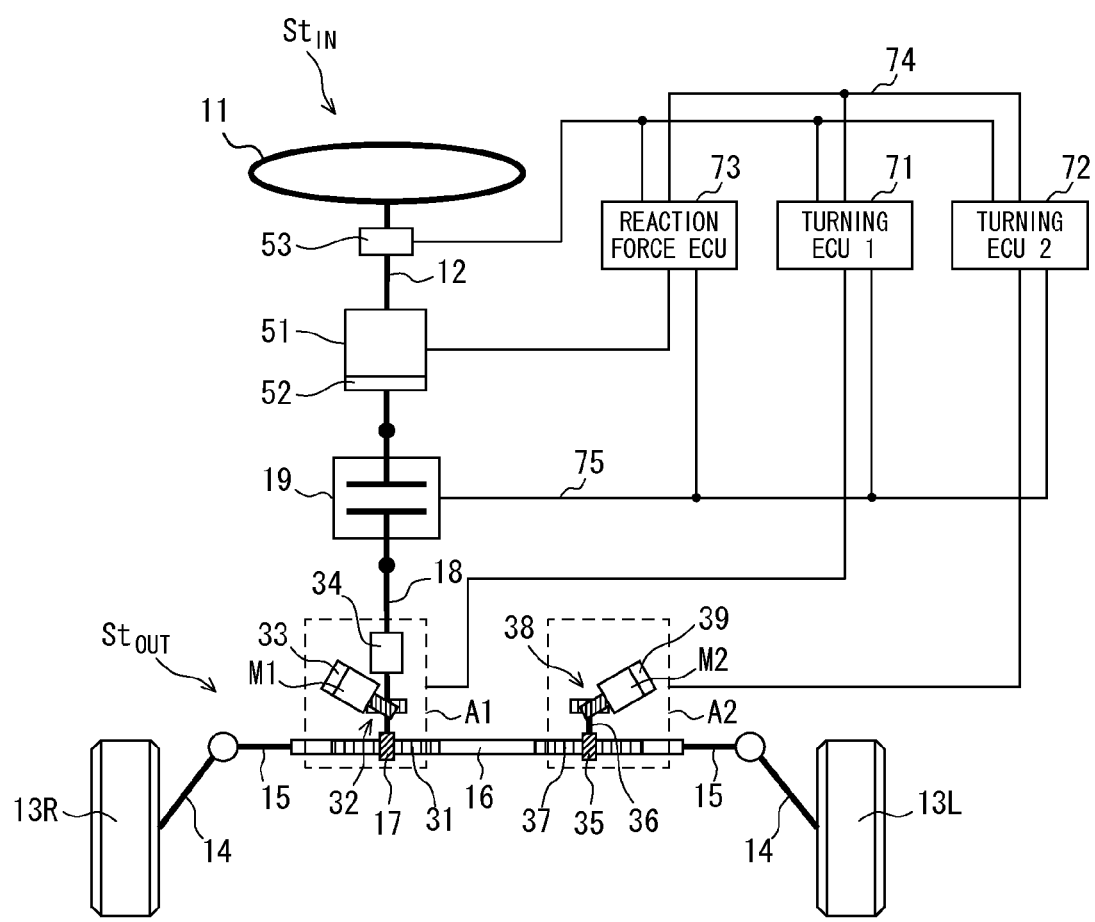
FIG. 1 schematically describes the configuration of a steering device.

Firstly the following describes the configuration of steering-by-wire. FIG. 1 schematically describes the configuration of a steering device. A steering wheel 11 is joined to a steering shaft 12, and a wheel (turning wheel) 13L or 13R is joined to a first pinion shaft 18 via a steering arm 14, a tie rod 15, a rack shaft 16, and a pinion gear 17 in this order. The steering shaft 12 and the first pinion shaft 18 are joined to be switchable between connection and disconnection via a clutch 19.

Herein the steering wheel 11 and the steering shaft 12 located on the input side of the clutch 19 make up a steering input mechanism $St_{IN}$ to rotate the steering shaft 12 in accordance with the steering manipulation by a driver. The steering arms 14, the tie rods 15, the rack shaft 16, the pinion gear 17, and the first pinion shaft 18 located on the output side of the clutch 19 make up a turning output mechanism $St_{OUT}$ to turn the wheels 13L and 13R in accordance with the rotation of the first pinion shaft 18.

That is, when the clutch 19 is connected (engaged), and when the steering wheel 11 is rotated, then the steering shaft 12, the clutch 19 and the first pinion shaft 18 rotate. The rotary movement of the first pinion shaft 18 is converted into the forward/backward movement of the tie rods 15 by the rack shaft 16 and the pinion gear 17, thus turning the wheels 13L and 13R via the steering arms 14.

The clutch 19 includes a deenergization-engagement type electromagnetic clutch. That is, when the electromagnetic clutch is deenergized, a cam roller mechanism, for example, allows a roller to mesh with the cam face of the input shaft and the outer ring of the output shaft for engagement between the input shaft and the output shaft. On the other hand, when the electromagnetic clutch is energized, the meshing of the roller is canceled between the cam face of the input shaft and the outer ring of the output shaft because of suction by an armature for disengagement between the input shaft and the output shaft.

The rack shaft 16 is extended in the vehicle horizontal direction (vehicle width direction, on one side of which (in this case the vehicle right side) a rack gear (teeth) 31 is formed, where the pinion gear 17 is meshed with this rack gear 31. The meshing state between the rack gear 31 and the pinion gear 17 is adjusted by a retainer mechanism.

The first pinion shaft 18 includes the input shaft on the clutch side and the output shaft on the pinion gear side, where the output shaft is joined to a first turning motor M1 via a worm gear 32, for example. The first turning motor M1 is provided with a resolver 33, for example, to detect the rotary angle of the motor.

The worm gear 32 includes a worm wheel joined to the first pinion shaft 18 and a worm joined to the first turning motor M1, where the worm shaft obliquely crosses the worm wheel shaft. This is to make the module smaller in the direction perpendicular to the shaft of the first pinion shaft 18. The worm gear 32 is configured to rotate the worm wheel with the rotation of the worm, and to rotate the worm with the rotation of the worm wheel as well, i.e., the twisting angle of the worm is set larger than the angle of rest (frictional angle) to enable reverse driving.

Between the input shaft and the output shaft of the first pinion shaft 18, a torque sensor 34 is provided. The pinion gear 17, the output shaft of the first pinion shaft 18, the worm gear 32, the first turning motor M1, the resolver 33, and the torque sensor 34 as stated above are configured as an integrally composite component (assembly), which is called a first actuator A1. The first actuator A1 has commonality with components making up an electric power steering device.

When the first turning motor M1 is driven in the disconnection state of the clutch 19, the first pinion shaft 18 rotates via the worm gear 32 of the first actuator A1, so that the turning angles of the wheels 13L and 13R change in accordance with the rotary angle of the first turning motor M1. In this way, the first turning motor M1 is driven and controlled in accordance with the steering manipulation by the driver in the disconnection state of the clutch 19, whereby desired steering control characteristics can be achieved as a steering-by-wire function.

When the first turning motor M1 is driven in the connection state of the clutch 19, then motor torque is transmitted to the first pinion shaft 18 via the worm gear 32. In this way, the first turning motor M1 is driven and controlled in accordance with the steering manipulation by the driver in the connection state of the clutch 19, whereby desired assist characteristics can be achieved to reduce the load on the driver's manipulation.

On the other side (in this case the vehicle left side) of the rack shaft 16, a second pinion shaft 36 is joined via a pinion gear 35. That is, a rack gear (teeth) 37 is formed on the other side (in this case the vehicle left side) of the rack shaft 16, where the pinion gear 35 is meshed with this rack gear 37. The meshing state between the rack gear 37 and the pinion gear 35 is adjusted by a retainer mechanism.

The second pinion shaft 36 is joined with a second turning motor M2 via a worm gear 38, for example. The second turning motor M2 is of the same type of the first turning motor M1. The second turning motor M2 is provided with a resolver 39, for example, to detect the rotary angle of the motor. The worm gear 38 includes a worm wheel joined to the second pinion shaft 36 and a worm joined to the second turning motor M2, where the worm shaft obliquely crosses the worm wheel shaft. This is to make the module smaller in the direction perpendicular to the shaft of the second pinion shaft 36.

The worm gear 38 is configured to rotate the worm wheel with the rotation of the worm, and to rotate the worm with the rotation of the worm wheel as well, i.e., the twisting angle of the worm is set larger than the angle of rest (frictional angle) to enable reverse driving.

The pinion gear 35, the output shaft of the second pinion shaft 36, the worm gear 38, the second turning motor M2, and the resolver 39 as stated above are configured as an integrally composite component (assembly), which is called a second actuator A2. When the second turning motor M2 is driven in the disconnection state of the clutch 19, the second pinion shaft 36 rotates via the worm gear 38 of the second actuator A2, so that the turning angles of the wheels 13L and 13R change in accordance with the rotary angle of the second turning motor M2. In this way, the second turning motor M2 is driven and controlled in accordance with the steering manipulation by the driver in the disconnection state of the clutch 19, whereby desired steering control characteristics can be achieved as a steering-by-wire function.

The steering shaft 12 is joined to a reaction motor 51. The reaction motor 51 includes a rotor that rotates with the steering shaft 12, and a stator that is fixed to a housing to be opposed to this rotor. The rotor includes magnets disposed at regular intervals along the circumferential direction that are fixed to a rotor core by insert molding, for example. The stator includes iron cores, around which coils are wound, disposed at regular intervals along the circumferential direction and fixed to a housing by shrink fit, for example. The reaction motor 51 is provided with a resolver 52, for example, to detect the rotary angle of the motor. The steering shaft 12 is provided with a steering angle sensor 53.

When the reaction motor 51 is driven in the disconnection state of the clutch 19, motor torque is transmitted to the steering shaft 12. In this way, the reaction motor 51 is driven and controlled in accordance with the reaction force given from the road surface in the disconnection state of the clutch 19 and during execution of steering-by-wire, whereby desired reaction force characteristics can be achieved to give an operation reaction force in response to the steering manipulation by the driver. That is the configuration of the steering device.

Next, the following describes the configuration of a control system. The present embodiment includes a first turning controller (turning ECU1) 71, a second turning controller (turning ECU2) 72, a reaction force controller (reaction force ECU) 73. Each controller includes a microcomputer, for example.

The first turning controller 71 receives a signal from the resolver 33, the torque sensor 34 and the steering angle sensor 53 as an input to control driving of the first turning motor M1 via a driving circuit. The second turning controller 72 receives a signal from the resolver 39, and the steering angle sensor 53 as an input to control driving of the second turning motor M2 via a driving circuit. The reaction force controller 73 receives a signal from the resolver 52 and the steering angle sensor 53 as an input to control driving of the reaction motor 51 via a driving circuit.

The resolver 33 detects a motor rotary angle $\theta m1$ of the first turning motor M1. This resolver 33 is configured to, when an energization signal is input to the stator coil, output a detection signal in accordance with the rotary angle of the rotor from the rotor coil. The first turning controller 71 includes a signal processing circuit to output an energization signal to the stator coil, and determines the motor rotary angle $\theta m1$ of the first turning motor M1 based on the amplitude modulation of the detection signal input from the rotor coil. Note here that the first turning controller 71 deals with right-turning as a positive value and left-turning as a negative value.

Similarly the motor rotary angle $\theta m2$ of the second turning motor M2 is detected by the second turning controller 72 via the resolver 39, and the motor rotary angle θr of the reaction motor 51 is detected by the reaction force controller 73 via the resolver 52.

The torque sensor 34 detects torque Ts input to the first pinion shaft 18. This torque sensor 34 detects the torsion angle of the torsion bar intervening between the input side and the output side of the first pinion shaft 18 with a Hall element, for example, and converts a change in magnetic flux density generated due to a relative angular displacement between a multipolar magnet and a york into an electrical signal and outputs it to the first turning controller 71. The first turning controller 71 then determines torque Ts from the input electrical signal. Note here that the first turning controller 71 deals with right-steering by the driver as a positive value and left-steering as a negative value.

The steering angle sensor 53 includes a rotary encoder, for example, and detects the steering angle θs of the steering shaft 12. This steering angle sensor 53 includes two phototransistors to detect light passing through a slit of a disk-shaped scale that rotates with the steering shaft 12, and outputs a pulse signal in accordance with the rotation of the steering shaft 12 to each controller. Each controller determines the steering angle θs of the steering shaft 12 from the input pulse signal. Note here that each controller deals with right-turning as a positive value and left-turning as a negative value.

The controllers are connected to be communicable mutually via a communication line 74. That is, they configure a communication path using a CSMA/CA scheme multi-channel communication (CAN: Controller Area Network) or using an in-vehicle communication network (onboard LAN) such as Flex Ray.

Each controller is connected to the clutch 19 via a communication line 75. This communication line 75 is a communication path to output a clutch control signal to enable switching between connection and disconnection of the clutch 19. A clutch control signal is to disconnect the clutch 19, so that when each controller outputs a clutch control signal, the clutch 19 is disconnected, and when any one of the controllers stops the output of the clutch control signal, then the clutch 19 is connected. That is the configuration of the control system.

Next, the following describes control modes. The present embodiment has a two-motor SBW mode (2M-SBW), a two-motor EPS mode (2M-EPS), a one-motor SBW mode (1M-SBW), a one-motor EPS mode (1M-EPS), and a manual steering mode (MS).

The two-motor SBW mode is to execute steering-by wire control using two motors, and the two-motor EPS mode is to execute electric power steering control using two motors. The one-motor SBW mode is to execute steering-by wire control using one motor, and the one-motor EPS mode is to execute electric power steering control using one motor. Then the manual steering mode is to stop all of the steering control.

[Two-Motor SBW Mode]

In the two-motor SBW mode, when the clutch 19 is disconnected in response to a clutch control signal output, the first turning controller 71 drives and controls the first turning motor M1 and the second turning controller 72 drives and controls the second turning motor M2 for turning angle control. That is, the first turning motor M1 and the second turning motor M2 cooperate to share the required turning force for outputting. Meanwhile the reaction force controller 73 drives and controls the reaction motor 51 to execute reaction force control. This can achieve desired steering characteristics as the steering-by wire function and can achieve favorable manipulation feeling.

The first turning controller 71 and the second turning controller 72 set a target turning angle θw* for the steering angle θs and estimate an actual turning angle θw. When receiving the motor rotary angles θm1 and θm2 as an input, they control driving of the first turning motor M1 and the second turning motor M2 using a robust model matching scheme, for example, to make the actual turning angle θw agree with the target turning angle θw*.

The target turning angle θw* may be set in accordance with vehicle velocity V, for example. That is, during dry steering or during low-speed traveling, the target turning angle θw* may be set to achieve large turning angle θw from small steering angle θs, thus reducing the load on the driver's manipulation. During high-speed traveling, the target turning angle θw* may be set to suppress a change in turning angle θw with reference to a change in the steering angle θs, thus suppressing too sensitive vehicle behavior and keeping traveling stability.

The actual turning angle θw may be estimated based on the steering angle θs, the motor rotary angle θm1, the motor rotary angle θm2 and the like.

The reaction force controller 73 sets a target reaction force torque Tr* corresponding to a reaction force given from the road surface during steering manipulation, and drives and controls the reaction motor 51 to make the torque of the reaction motor 51 agree with this target reaction force torque Tr*.

The target reaction force torque Tr* may be set based on the steering angle θs, current Im1 flowing through the first turning motor M1, current Im2 flowing through the second turning motor M2 and the like, for example.

[Two-Motor EPS Mode]

In the two-motor EPS mode, when the clutch 19 is connected in response to stopping of the output of a clutch control signal, the first turning controller 71 drives and controls the first turning motor M1 and the second turning controller 72 drives and controls the second turning motor M2 for assist control. This can join the steering system mechanically to keep the direct steering operability, and then to reduce the load on the driver's manipulation with an electric power-steering function.

The first turning controller 71 and the second turning controller 72 set a target assist torque Ta*, and control driving of the first turning motor M1 and the second turning motor M2 to make the torque of the first turning motor M1 agree with this target assist torque Ta*.

The target assist torque Ta* may be set in accordance with vehicle velocity V, for example. That is, during dry steering or during low-speed traveling, large target assist torque Ta* may be set to reduce the load on the driver's manipulation. During high-speed traveling, small target assist torque Ta* may be set to suppress too sensitive vehicle behavior and keep traveling stability.

Meanwhile, in the two-motor EPS mode, the relay circuit of the reaction motor 51 is disconnected. When the driver manipulates the steering, the first turning controller 71 drives and controls the first turning motor M1 and the second turning controller 72 drives and controls the second turning motor M2, this is for driving the reaction motor 51 with the rotation of the steering shaft 12 so that the reaction motor 51 itself does not become the load.

[One-Motor SBW Mode]

In the one-motor SBW mode, when the clutch 19 is disconnected in response to a clutch control signal output, and when the first turning controller 71 does not control driving of the first turning motor M1 (not-driven state), the second turning controller 72 drives and controls the second turning motor M2 for turning angle control. That is, the second turning motor M2 alone outputs required turning force. Meanwhile the reaction force controller 73 drives and controls the reaction motor 51 to execute reaction force control. This can achieve desired steering characteristics as the steering-by-wire function and can achieve favorable manipulation feeling.

Setting of the target turning angle θw*, controlling by the second turning motor M2, setting of the target reaction force torque Tr* and controlling by the reaction motor 51 may be similar to those of the two-motor SBW mode.

Meanwhile, in the one-motor SBW mode, the relay circuit of the first turning motor M1 is disconnected, so that the first turning motor M1 is disconnected from the circuit. That is, when the second turning controller 72 drives and controls the second turning motor M2, this is for driving the first turning motor M1 by the forward/backward movement of the rack shaft 16, so that the first turning motor M1 itself does not become the load.

[One-Motor EPS Mode]

In the one-motor EPS mode, when the clutch 19 is connected in response to stopping of the output of a clutch control signal, and when the second turning controller 72 does not control driving of the second turning motor M2 (not-driven state), the first turning controller 71 drives and controls the first turning motor M1 for assist control. This can join the steering system mechanically to keep the direct steering operability, and then to reduce the load on the driver's manipulation with an electric power-steering function.

Setting of the target assist torque Ta* and controlling by the first turning motor M1 may be similar to those of the two-motor EPS mode.

Meanwhile, in the one-motor EPS mode, the relay circuit of the second turning motor M2 is disconnected, so that the second turning motor M2 is disconnected from the circuit. That is, when the first turning controller 71 drives and controls the first turning motor M1, this is for driving the second turning motor M2 by the forward/backward movement of the rack shaft 16, so that the second turning motor M2 itself does not become the load. For a similar reason, the relay circuit of the reaction motor 51 also is disconnected, so that the reaction motor 51 is disconnected from the circuit. That is, when the driver manipulates the steering and the first turning controller 71 drives and controls the first turning motor M1, this is for driving the reaction motor 51 by the rotation of the steering shaft 12, so that the reaction motor 51 itself does not become the load.

[Manual Steering Mode]

In the manual steering mode, when the clutch 19 is connected in response to stopping of the output of a clutch control signal, the first turning controller 71 does not control driving of the first turning motor M1 (not-driven state), and the second turning controller 72 does not control driving of the second turning motor M2 (not-driven state). That is, steering control of all of the controllers is stopped. This can join the steering system mechanically to keep the direct steering operability.

In the manual steering mode, the relay circuit of the first turning motor M1 and the relay circuit of the second turning motor M2 are disconnected, so that the first turning motor M1 and the second turning motor M2 are disconnected from the circuits. That is, when the driver manipulates the steering, this is for driving the first turning motor M1 and the second turning motor M2 by the forward/backward movement of the rack shaft 16, so that the first turning motor M1 and the second turning motor M2 do not become the load. For a similar reason, the relay circuit of the reaction motor 51 also is disconnected, so that the reaction motor 51 is disconnected from the circuit. That is, when the driver manipulates the steering, this is for driving the reaction motor 51 by the rotation of the steering shaft 12, so that the reaction motor 51 itself does not become the load. That is the outline of the control modes.

Next, the following describes fail safe. Each controller performs self-diagnosis about whether its own control system has abnormality or not, and switches a control mode in accordance with the diagnosis result. That is, the first turning controller 71 diagnoses whether the first turning controller 71 itself, the first actuator A1 having the torque sensor 34, and the wiring system have abnormality or not. The second turning controller 72 diagnoses whether the second turning controller 72 itself, the second actuator A2 without a torque sensor and the wiring system have an abnormality or not. The reaction force controller 73 diagnoses whether the reaction force controller 73 itself, the reaction motor 51, and the wiring system have an abnormality or not.

Firstly when the control system of the first turning controller 71, the control system of the second turning controller 72 and the control system of the reaction force controller 73 are all normal, the control mode becomes the two-motor SBW mode. Herein, at the time of low-voltage or of overheating of the first turning motor M1 and the second turning motor M2, during starting while turning the ignition ON (until the clutch 19 is disconnected), and at the time of end contact where the turning angle θw reaches the maximum turning angle, for example, the control mode becomes the two-motor EPS mode temporarily.

On the other hand, when at least one of the control system of the first turning controller 71, the control system of the second turning controller 72 and the control system of the reaction force controller 73 generates abnormality, the control mode switches to any one of the one-motor SBW mode, the one-motor EPS mode and the manual steering (MS) mode.

Firstly considered is the case where the control system of the second turning controller 72 and the control system of the reaction force controller 73 are normal, but the control system of the first turning controller 71 generates abnormality. In this case, since the abnormality occurs just at the steering by wire function or the electric power steering function by the first actuator A1, and the steering by wire function by the second actuator A2 and the reaction force generation function by the reaction motor 51 are kept, the control mode is set at the one-motor SBW mode.

There is another case where the control system of the first turning controller 71 and the control system of the reaction force controller 73 are normal, but the control system of the second turning controller 72 generates abnormality. In this case, since the abnormality occurs just at the steering by wire function by the second actuator A2 and the electric power steering function by the first actuator A1 is kept, the control mode is set at the one-motor EPS mode.

There is still another case where the control system of the second turning controller 71 and the control system of the second turning controller 72 are normal, but the control system of the reaction force controller 73 generates abnormality. In this case, since the abnormality occurs just at the reaction force generation function by the reaction motor 51, and the electric power steering function by the first actuator A1 is kept, the control mode is set at the one-motor EPS mode.

There is a further case where the control system of the first turning controller 71 is normal, but the control system of the second turning controller 72 and the control system of the reaction force controller 73 generate abnormality. In this case, since the abnormality occurs just at the steering by wire function by the second actuator A2 and the reaction force generation function by the reaction motor 51, and the electric power steering function by the first actuator A1 is kept, the control mode is set at the one-motor EPS mode.

There is a still further case where the control system of the reaction force controller 73 is normal, but the control system of the first turning controller 71 and the control system of the second turning controller 72 generate abnormality. In this case, although the reaction force generation function by the reaction motor 51 is kept, abnormality occurs at the steering by wire function and the electric power steering function by the first actuator A1 and the steering by wire function by the second actuator A2, and so the control mode is set at the manual steering mode.

There is another case where the control system of the second turning controller 72 is normal, but the control system of the first turning controller 71 and the control system of the reaction force controller 73 generate abnormality. In this case, although the steering by wire function by the second actuator A2 is kept, abnormality occurs at the steering by wire function and the electric power steering function by the first actuator A1 and the reaction force generation function by the reaction motor 51, and so the control mode is set at the manual steering mode.

There is still another case where all of the control system of the first turning controller 71, the control system of the second turning controller 72 and the control system of the reaction force controller 73 generate abnormality. In this case, since all of the steering by wire function and the electric power steering function by the first actuator A1, the steering by wire function by the second actuator A2 and the reaction force generation function by the reaction motor 51 generate abnormality, the control mode is set at the manual steering mode. That is the outline of the fail safe.

Next, the following describes transition of control modes. Firstly in the case where all of the control system of the first turning controller 71, the control system of the second turning controller 72, and the control system of the reaction force controller 73 are normal, the control mode is basically set at the two-motor SBW mode. Then at the time of low-voltage or of overheating of the first turning motor M1 and the second turning motor M2, during starting while turning the ignition ON (until the clutch 19 is disconnected), and at the time of end contact where the turning angle θw reaches the maximum turning angle, for example, the control mode becomes the two-motor EPS mode temporarily. Then, when the low-voltage or the overheating of the first turning motor M1 and the second turning motor M2 is solved, the clutch 19 is disconnected, and the turning angle θ decreases, the control mode becomes the two-motor SBW mode. In this way, as long as all of the control system of the first turning controller 71, the control system of the second turning controller 72, and the control system of the reaction force controller 73 are normally operated, the control mode transitions between the two-motor SBW mode and the two-motor EPS mode.

If the control system of the first turning controller 71 generates abnormality as a primary failure, the control mode transitions from the two-motor SBW mode to the one-motor SBW mode. If at least one of the control system of the second turning controller 72 and the control system of the reaction force controller 73 generates abnormality as a secondary failure, then the control mode transitions from the one-motor SBW mode to the manual steering mode. In this way, the transition does not occur directly from the two-motor SBW mode to the manual steering mode while skipping the one-motor SBW mode, and the control mode transitions step by step in accordance with the level of a failure for redundancy.

If at least one of the control system of the second turning controller 72 and the control system of the reaction force controller 73 generates abnormality as a primary failure, the control mode transitions from the two-motor SBW mode to the one-motor EPS mode. Then if the control system of the first turning controller 71 generates abnormality as a secondary failure, then the control mode transitions from the one-motor EPS mode to the manual steering mode. In this way, the transition does not occur directly from the two-motor SBW mode to the manual steering mode while skipping the one-motor EPS mode, and the control mode transitions step by step in accordance with the level of a failure for redundancy.

When the control mode is in the two-motor EPS mode temporarily, if at least one of the control system of the second turning controller 72 and the control system of the reaction force controller 73 generates abnormality as a primary failure, then the control mode transitions to the one-motor EPS mode. Then if the control system of the first turning controller 71 generates abnormality as a second failure, the control mode transitions from the one-motor EPS mode to the manual steering mode. In this way, the transition does not occur directly from the two-motor SBW mode to the manual steering mode while skipping the one-motor EPS mode, and the control mode transitions step by step in accordance with the level of a failure for redundancy.

When the control mode is in the two-motor EPS mode temporarily, if the control system of the first turning controller 71 generates abnormality, then the control mode is not allowed to transition to the one-motor EPS mode. Then the control mode transitions directly to the manually steering mode. That is the transition of the control modes.

Next, the following describes basic control processing of the steering by wire. In the steering by wire control processing, the first turning controller 71, the second turning controller 72 and the reaction force controller 73 individually perform operations, and when the result of the operations by these controllers agree, then the execution of driving/controlling is permitted. As stated above, the first turning controller 71 drives and controls the first turning motor M1, the second turning controller 72 drives and controls the second turning motor M2, and the reaction force controller 73 drives and controls the reaction motor 51.

Firstly when the ignition switch is OFF, the clutch 19 is engaged. Then when the ignition switch is ON, the clutch 19 is disconnected, and the two-motor SBW mode is executed. The steering by wire sets target reaction force torque corresponding to a reaction force given from the road surface in response to a steering manipulation, and drives and controls the reaction motor 51 based on a current command value to realize this target reaction force torque. Herein the reaction force given from the road surface may be determined based on the steering angle θs, the vehicle velocity V, the turning angle θw, the current Im1 flowing through the first turning motor M1 and the current Im2 flowing through the second turning motor M2, for example. Then, target turning angle is set for the steering angle θs, and then the first turning motor M1 and the second turning motor M2 are driven and controlled based on the current command value to realize this target turning angle. Herein, the target turning angle may be set based on the steering angle θs and steering angle ratio corresponding to the vehicle velocity V, for example. That is the basic control processing in the steering by wire.

Next, the following describes neutral position displacement in the steering by wire. When the steering wheel 11 is manipulated in the state where the steering shaft 12 and the pinion shaft 18 are disconnected, and when both of the first turning motor M1 and the second turning motor M2 are in a non-driven state, then the rotary angle of the steering shaft 12 and the rotary angle of the pinion shaft 18 change. That is, displacement occurs between the neutral position of the steering shaft 12 and the neutral position of the pinion shaft 18, which is referred to as neutral position displacement. Since the clutch 19 is engaged when the ignition switch is OFF as stated above, steering manipulation in this state does not cause the displacement between the neutral position of the steering shaft 12 and the neutral position of the pinion shaft 18. However, when the ignition switch is turned off from ON, there is a small time lag between outputting of a command to engage the clutch 19 and actual engaging of the clutch 19. If the steering manipulation is performed during this duration, the neutral position displacement may occur, and such neutral position displacement has to be corrected after the steering by wire is started.

When the ignition switch is turned ON from OFF, the steering by wire processing firstly executes the processing to detect the neutral position displacement. This processing to detect the neutral position displacement is executed only once during the starting at the first turning controller 71, the second turning controller 72 and the reaction force controller 73.

Figure 2:
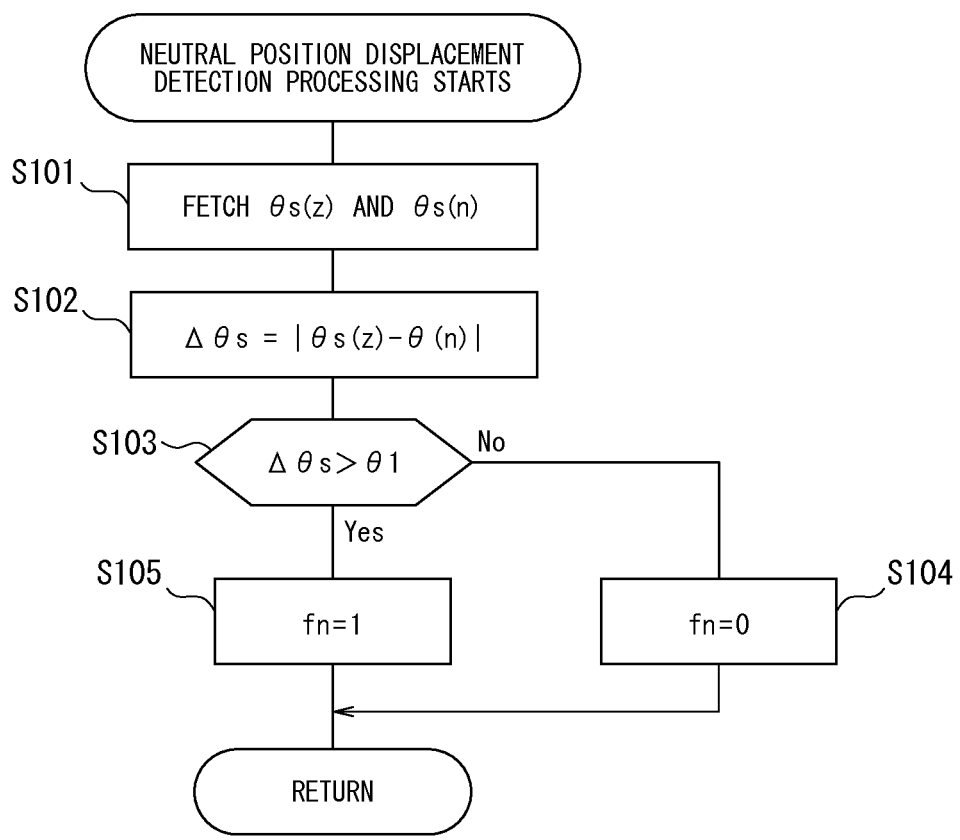
FIG. 2 is a flowchart illustrative of the processing to detect neutral position displacement.

The following describes the processing to detect neutral position displacement. FIG. 2 is a flowchart illustrative of the processing to detect neutral position displacement.

Firstly at Step S101, ending steering angle θs(z) when the ignition switch is turned OFF from ON and starting steering angle θs(n) when the ignition switch is turned ON from OFF are fetched. The ending steering angle θs(z) is stored beforehand in a non-volatile memory when the ignition switch is turned OFF from ON. At the subsequent Step S102, a difference Δθs(=|θs(z)−θs(n)|) between the ending steering angle θs(z) and the starting steering angle θs(n) is calculated.

At the subsequent Step S103, determination is made whether the difference Δθs is larger than a predetermined threshold θ1 or not. Since this threshold θ1 is a value to determine whether the steering manipulation is performed or not after turning the ignition switch OFF, the value is relatively small about 2 [deg], for example. Herein, when the result is Δθs≤θ1, then it is determined that the steering wheel 11 is not moved, and the procedure proceeds to Step S104. On the other hand, when the result is Δθs>θ1, then it is determined that the steering wheel 11 is moved, and the procedure proceeds to Step S105.

At Step S104, a detection flag is reset to fn=0, and the procedure returns to a predetermined main program. The detection flag fn=0 represents that there is no possibility (or low possibility) of neutral position displacement.

At Step S105, the detection flag is set at fn=1, and the procedure returns to a predetermined main program. The detection flag fn=1 represents that there is possibility (or high possibility) of neutral position displacement. The detection flag fn is used for stability control described later. That is the processing to detect neutral position displacement.

Figure 3:
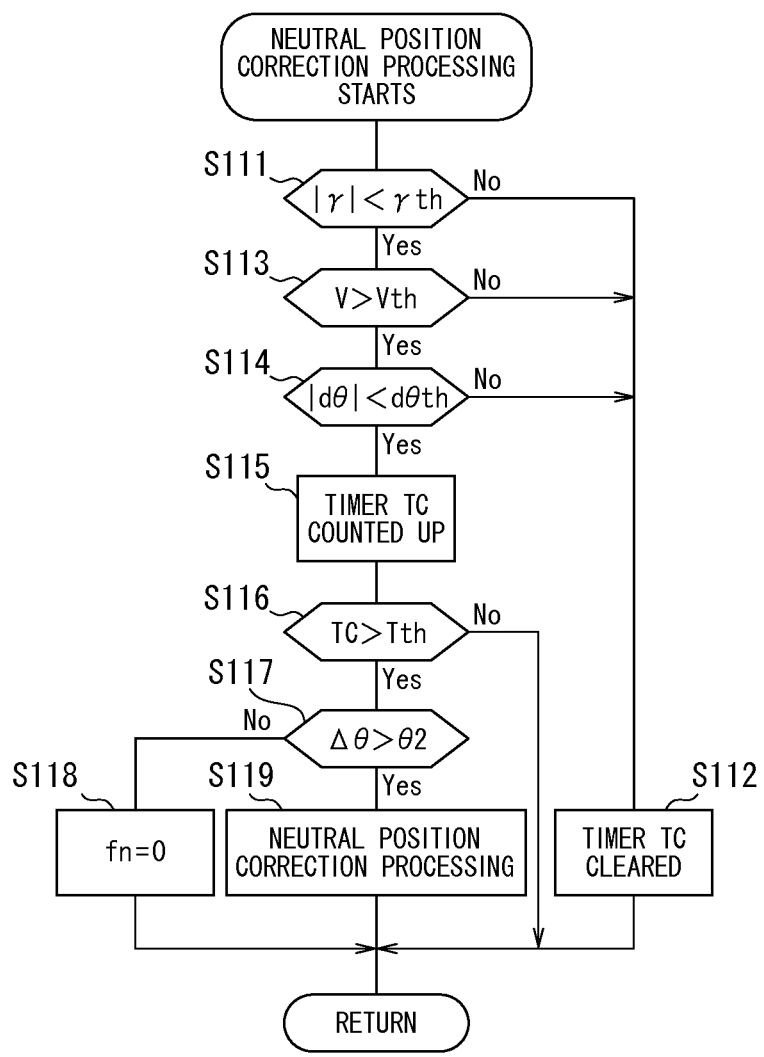
FIG. 3 is a flowchart illustrative of the processing to correct neutral position displacement.

Next, the following describes processing to correct neutral position displacement. FIG. 3 is a flowchart illustrative of the processing to correct neutral position displacement.

Firstly at Step S111, determination is made whether the absolute value |γ| of the yaw rate is smaller or not than a predetermined threshold γth. This threshold γth is a value to determine whether the vehicle travels substantially straight ahead or not, which may be about 0.4 [deg/s], for example. When the result of determination is |γ|≥γth, it is determined that the vehicle does not travel straight ahead, and so it is not a correction timing of the neutral position displacement, and the procedure proceeds to Step S112. On the other hand, when the result of determination is |γ|<γth, it is determined that the vehicle travels substantially straight ahead, and the procedure proceeds to Step S113.

At Step S112, a timer TC is cleared, and the procedure returns to a predetermined main program.

At Step S113, determination is made whether the vehicle velocity V is larger than a predetermined Vth or not. This threshold Vth is a value to determine whether the vehicle speed exceeds a low-speed region or not, which may be about 20 km/h, for example. When the result of determination is V≤Vth, it is determined that the vehicle stops or in the low-speed region, and so it is not a correction timing of the neutral position displacement, and the procedure proceeds to Step S112. On the other hand, when the result of determination is V>Vth, it is determined that the vehicle is in a travel state exceeding the low-speed region, and the procedure proceeds to Step S114.

At Step S114, determination is made whether the absolute value |dθ| of the steering angle speed is smaller than a predetermined threshold dθth or not. This threshold dθth is a value to determine whether the driver substantially holds the steering or not, which may be about 10 [deg/s], for example. When the result of determination is |dθ|≥dθth, it is determined that the driver does not hold the steering, and so it is not a correction timing of the neutral position displacement, and the procedure proceeds to Step S112. On the other hand, when the result of determination is |dθ|<dθth, it is determined that the driver holds the steering, and the procedure proceeds to Step S114.

At Step S115, the timer TC is counted up. At the subsequent Step S116, determination is made whether the timer TC is longer than predetermined duration Tth or not. This duration Tth may be about 3 [sec], for example. When the result of determination is TC≤Tth, it is determined that the driver may not hold the steering, and the procedure returns to the predetermined main program. On the other hand, when the result of determination is TC>Tth, it is determined that the driver holds the steering in a substantially straight-ahead travel state, and that it is a timing to correct the neutral position displacement, and the procedure proceeds to Step S117.

At Step S117, determination is made whether the amount of neutral position displacement between the steering angle θs and the turning angle θw, Δθ(=θs−θw) is larger than a predetermined threshold θ2 or not. This threshold θ2 may be about 6 [deg], for example. When the result of determination is Δθ≤θ2, it is determined that no neutral position displacement occurs or the displacement if any is in the permissible range, and the procedure proceeds to Step S118. On the other hand, when the result of determination is Δθ>θ2, it is determined that neutral position displacement occurs, and the procedure proceeds to Step S119.

At Step S118, the detection flag is reset at fn=0, and the procedure returns to the predetermined main program. At Step S119, the processing to correct neutral position displacement is conducted, and then the procedure returns to the predetermined main program.

The processing to correct neutral position displacement firstly sets a correction angle to reduce a separation between the target turning angle corresponding to the steering angle θs and the actual turning angle. Then, the current command value is corrected based on this correction angle, and the first turning motor M1 and the second turning motor M2 are driven and controlled based on the corrected current command value, thus canceling the neutral position displacement gradually. That is the processing to correct neutral position displacement.

Next the following describes stability control. Stability control is to, when the road surface is slippery or emergency avoidance is performed for an obstacle, and transverse slipping tendency (oversteer) of a rear wheel or transverse slipping tendency (understeer) of a front wheel is detected, improve the stability during turning by engine control and brake control. This stability control is called VDC (Vehicle Dynamics Control), ESC (Electric Stability Control), or the like.

Figure 4:
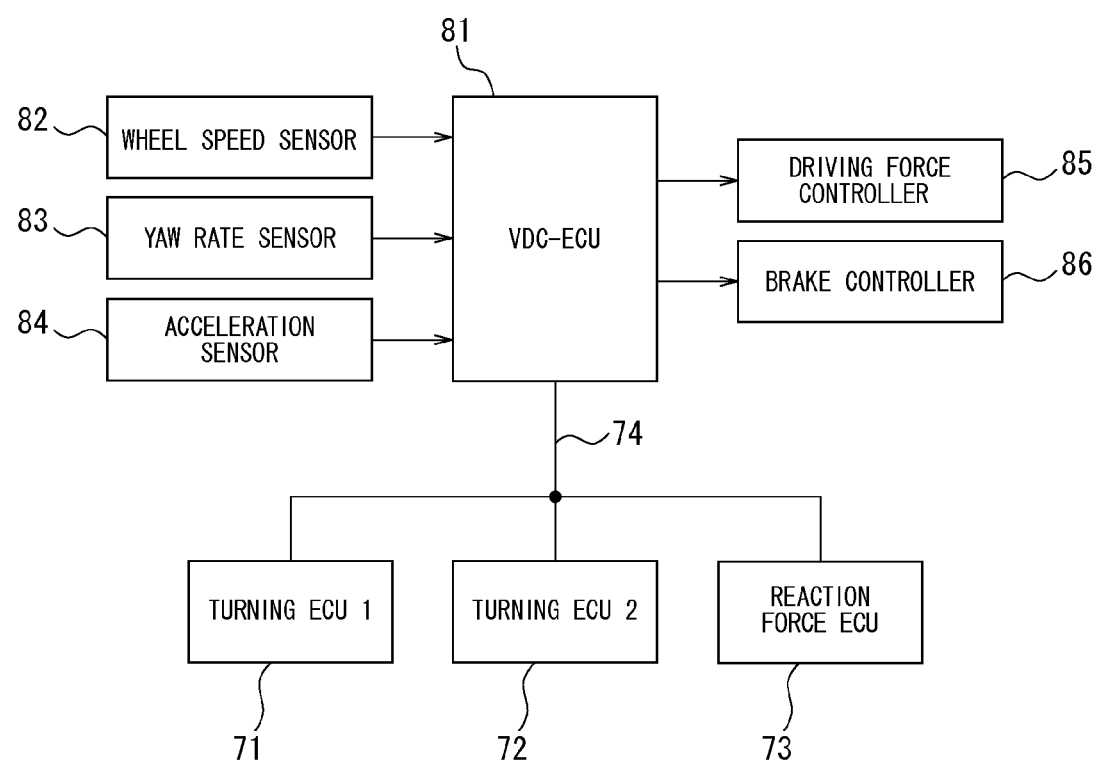
FIG. 4 describes a system configuration of the stability control.

The following describes the outline of the configuration of stability control. FIG. 4 describes a system configuration of the stability control. In the stability control, a VDC controller 81 (VDC-ECU) executes stability control in accordance with a detected value from various sensors. The various sensors include a wheel speed sensor 82, a yaw rate sensor 83, an acceleration sensor 84 and the like. The VDC controller 81 is connected to other controllers such as the first turning controller 71, the second turning controller 72, and the reaction force controller 73 via a communication line 74 to be mutually communicable, and receives a steering angle signal as an input, for example.

The wheel speed sensor 82 detects wheel speed $Vw_{FL}$ to $Vw_{RR}$ of each wheel. This wheel speed sensor 82 detects magnetic lines of force of a sensor rotor, for example, with a detection circuit, converts a change in magnetic field with the rotation of the sensor rotor into a current signal, and outputs it to the VDC controller 81. The VDC controller 81 determines wheel speed $Vw_{FL}$ to $Vw_{RR}$ from the input current signal.

The yaw rate sensor 83 detects yaw rate $\gamma$ of the vehicle body. This yaw rate sensor 83 is provided at the vehicle body above the spring, and is configured to vibrate an oscillator including a crystal tuning fork, for example, with AC voltage, converts the amount of distortion at the oscillator generated from coriolis force when angular speed is input into electric signal, and outputs it to the VDC controller 81. The VDC controller 81 determines the yaw rate $\gamma$ of the vehicle from the input electric signal. The VDC controller 81 deals with right turning as a positive value and left turning as a negative value.

The acceleration sensor 84 detects the degree of acceleration/deceleration in the longitudinal direction of the vehicle. This acceleration sensor 84 detects positional displacement of a movable electrode with reference of a fixed electrode as a change in electrostatic capacity, for example, convert it into a voltage signal that is proportional to the degree of acceleration/deceleration and the direction and outputs it to the VDC controller 81. The VDC controller 81 determines the degree of acceleration/deceleration from the input voltage signal. The VDC controller 81 deals with acceleration as a positive value and deceleration as a negative value.

The VDC controller 81 executes stability control processing, and controls the driving force via a driving force controller 85 so that the turning behavior of the vehicle agrees with target turning behavior, and controls the braking force via a brake controller 86.

The driving force controller 85 controls the driving force of the rotational drive source. When the rotational drive source is an engine, for example, the opening degree of a throttle valve, the amount of fuel injection, ignition timing and the like are adjusted to control the engine output (rotation number and engine torque). When the rotational drive source is a motor, the motor output (rotation number and motor torque) is controlled via an inverter.

As one example of the driving force controller 85, the following describes the configuration of an electronic control throttle to control the opening degree of a throttle valve.

Figure 5:
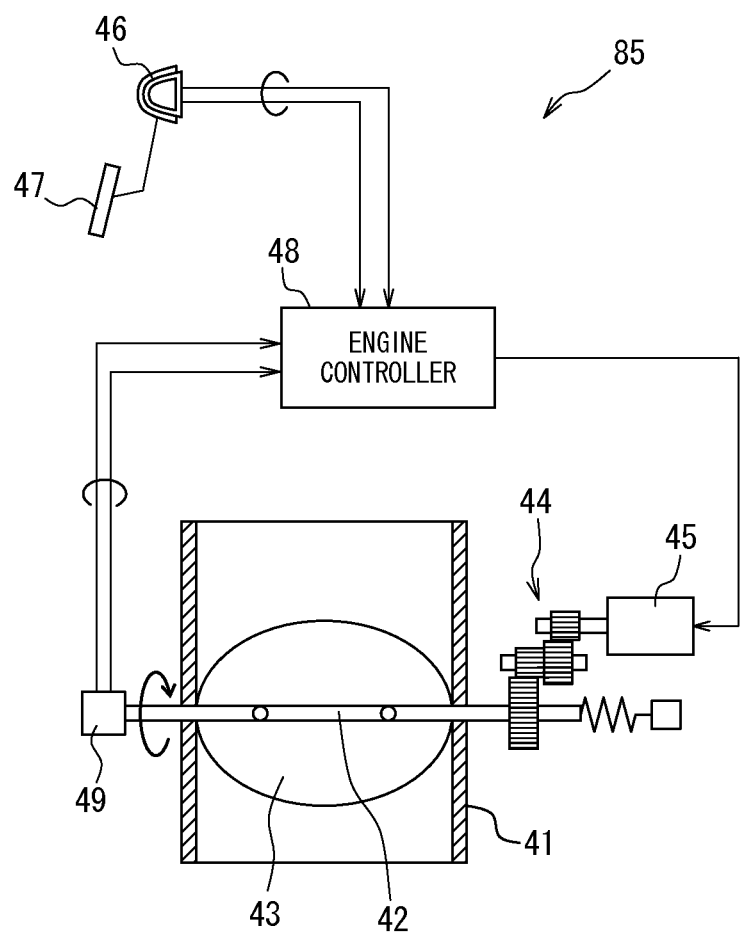
FIG. 5 describes the configuration of a system of an electronic control throttle.

FIG. 5 describes the configuration of a system of an electronic control throttle. In an intake pipe path 41 (e.g., an intake manifold), a throttle shaft 42 is supported to be extended in the radial direction, and a disk-shaped throttle valve 43 having a diameter less than the inner diameter of the intake pipe path 41 is fixed to the throttle shaft 42. A throttle motor 45 is joined to the throttle shaft 42 via a reducer 44.

That is, when the rotary angle of the throttle shaft 42 is changed by rotating the throttle motor 45, the throttle valve 43 opens and closes the inside of the intake pipe path 41. That is, when the planar direction of the throttle valve 43 is along the direction orthogonal to the axial direction of the intake pipe path 41, the opening degree of the throttle valve is at the totally-closed position, and when the planar direction of the throttle valve 43 is along the axial direction of the intake pipe path 41, the opening degree of the throttle valve is at the totally-open position. Considering the case where abnormality occurs at the throttle motor 45, the motor driving system, an accelerator sensor 46 system, a throttle sensor 49 system, and the like, the throttle shaft 42 is mechanically biased to the open direction so that the throttle valve 43 is open from the totally-closed position by predetermined amount.

An accelerator sensor 46 has two systems, and detects a pedal opening degree PPO that is the stepping amount (manipulation amount) of an accelerator pedal 47. The accelerator sensor 46 is a potentiometer, for example, which converts the pedal opening degree of the accelerator pedal 47 into a voltage signal, and outputs it to an engine controller 48. The engine controller 48 determines the pedal opening degree PPO of the accelerator pedal 47 from the input voltage signal.

A throttle sensor 49 has two systems, and detects an opening degree of a throttle valve SPO of the throttle valve 43. The throttle sensor 49 is a potentiometer, for example, which converts the opening degree of a throttle valve 43 into a voltage signal, and outputs it to the engine controller 48. The engine controller 48 determines the opening degree of a throttle valve SPO of the throttle valve 43 from the input voltage signal. Herein when the throttle valve 43 is at the totally closed position, the opening degree of a throttle valve SPO is 0%, and when the throttle valve 43 is at the totally open position, the opening degree of a throttle valve SPO is 100%

The engine controller 48 typically sets a target opening degree of a throttle valve SPO* in accordance with the pedal opening degree PPO, and sets a motor control amount in accordance with $\Delta PO$ between this target opening degree of a throttle valve SPO* and the actual opening degree of a throttle valve SPO. Then, the engine controller converts this motor control amount into duty ratio, and drives and controls the throttle motor 45 by a pulse current value. When receiving a driving command from a controller, the engine controller 48 gives a priority to the driving command to control driving of the throttle motor 45. For instance, receiving a driving command to reduce the driving force, the engine controller decreases the target opening degree of a throttle valve SPO* in accordance with the pedal opening degree PPO, and drives and controls the throttle motor 45. That is the description of the driving force controller 85.

Next, the following describes the brake controller 86. The brake controller 86 controls braking force of each wheel. For instance, fluid pressure of a wheel cylinder provided at each wheel is controlled by a brake actuator that is used for antiskid control (ABS) and traction control (TCS), for example.

Figure 6:
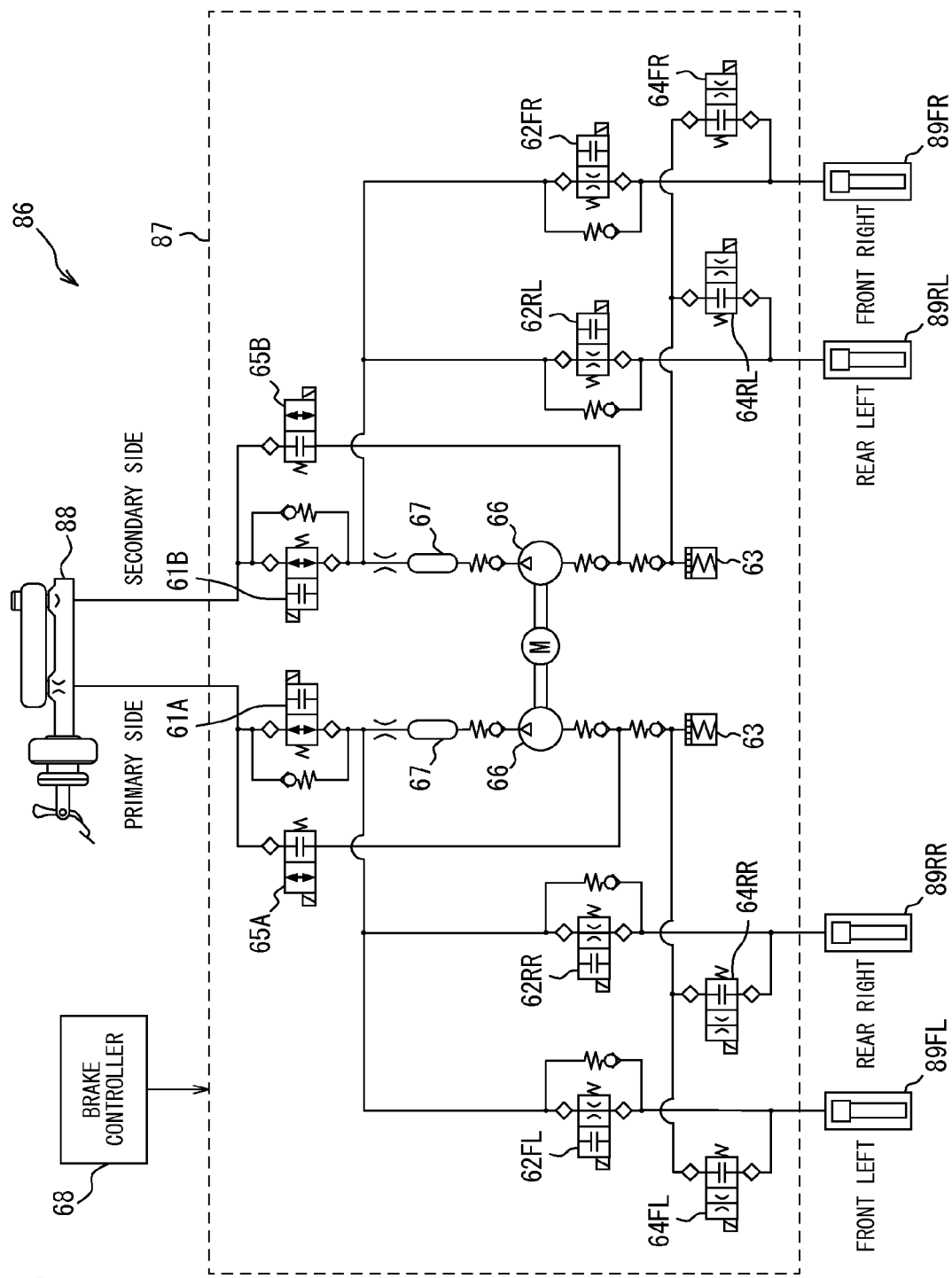
FIG. 6 schematically describes the configuration of a brake actuator.

The following describes the configuration of a brake actuator as one example of the brake controller 86. FIG. 6 schematically describes the configuration of a brake actuator. A brake actuator 87 is inserted between a master cylinder 88 and wheel cylinders 89FL and 89RR.

The master cylinder 88 is of a tandem type that forms two-system of fluid pressure in accordance with the pedal pressure of the driver, which is a diagonal split type having a primary side that is transmitted to the wheel cylinders 89FL/89RR of the front left and rear right and a secondary side that is transmitted to the wheel cylinders 89FR/89RL of the front right and rear left wheels.

Each wheel cylinder 89FL and 89RR is provided in a disk brake that generates braking force by sandwiching a disk rotor with brake pads or in a drum brake that generates braking force by pressing a brake shoe against the inner periphery of the brake drum.

The primary side is provided with a first gate valve 61A, an inlet valve 62FL (62RR), an accumulator 63, an outlet valve 64FL (64RR), a second gate valve 65A, a pump 66 and a damper chamber 67.

The first gate valve 61A is a normal open type valve that is capable of closing the channel between the master cylinder 88 and the wheel cylinder 89FL (89RR). The inlet valve 62FL (62RR) is a normal open type valve that is capable of closing the channel between the first gate valve 61A and the wheel cylinder 89FL (89RR). The accumulator 63 communicates with between the wheel cylinder 89FL (89RR) and the inlet valve 62FL (62RR). The outlet valve 64FL (64RR) is a normal close type valve that is capable of opening the channel between the wheel cylinder 89FL (89RR) and the accumulator 63. The second gate valve 65A is a normal close type valve that is capable of opening the channel communicating with between the master cylinder 88 and the first gate valve 61A and between the accumulator 63 and the outlet valve 64FL (64RR). The pump 66 has a suction side communicating with between the accumulator 63 and the outlet valve 64FL (64RR) and a discharge side communicating with between the first gate valve 61A and the inlet valve 62FL (62RR). The damper chamber 67 is provided on the discharge side of the pump 66 to suppress pulsation of brake fluid discharged and weaken pedal vibration.

Similarly to the primary side, the secondary side also is provided with a first gate valve 61B, an inlet valve 62FR (62RL), an accumulator 63, an outlet valve 64FR (64RL), a second gate valve 65B, a pump 66 and a damper chamber 67.

The first gate valves 61A, 61B, the inlet valves 62FL to 62RR, the outlet valves 64FL to 64RR, and the second gate valves 65A, 65B make up two-port two-position switching/single solenoid/spring offset type solenoid controlled valve. The first gate valves 61A, 61B and the inlet valves 62FL to 62RR open the channel at the deenergized normal position, and the outlet valves 64FL to 64RR and the second gate valves 65A, 65B close the channel at the deenergized normal position.

The accumulator 63 includes a spring-type accumulator having a compressed spring opposed to a piston of a cylinder. The pump 66 includes a capacity type pump such as a gear pump or a piston pump that can keep substantially constant discharge amount irrespective of load pressure.

With this configuration, in the case of the primary side, for example, when the first gate valve 61A, the inlet valve 62FL (62RR), the outlet valve 64FL (64RR), and the second gate valve 65A are all at the deenergized normal positions, fluid pressure from the master cylinder 88 is directly transmitted to the wheel cylinder 89FL (89RR), which serves as brake normally.

When the brake pedal is not manipulated as well, the first gate valve 61A is energized for closing while keeping the inlet valve 62FL (62RR) and the outlet valve 64FL (64RR) at the deenergized normal positions, and the second gate valve 65A is energized for opening and then the pump 66 is driven to suck the fluid pressure of the master cylinder 88 via the second gate valve 65A, and the discharged fluid pressure is transmitted to the wheel cylinder 89FL (89RR) via the inlet valve 62FL (62RR) for increased pressure.

Then, when the first gate valve 61A, the outlet valve 64FL (64RR) and the second gate valve 65A are at the deenergized normal positions and the inlet valve 62FL (62RR) is energized for closing, then the channels from the wheel cylinder 89FL (89RR) to the master cylinder 88 and the accumulator 63 are blocked, whereby the fluid pressure at the wheel cylinder 89FL (89RR) can be held.

When the first gate valve 61A and the second gate valve 65A are at the deenergized normal positions, and when the inlet valve 62FL (62RR) is energized for closing and the outlet valve 64FL (64RR) is energized for opening, then the fluid pressure at the wheel cylinder 89FL (89RR) flows into the accumulator 63 for decreased pressure. The fluid pressure flowing into the accumulator 63 is sucked by the pump 66, and is returned to the master cylinder 88.

Operations for normal braking/increased pressure/holding/decreased pressure on the secondary side are the same as those of the primary side, and so their detailed descriptions are omitted. A brake controller 68 drives and controls the first gate valves 61A, 61B, the inlet valves 62FL to 62RR, the outlet valves 64FL to 64RR, the second gate valves 65A, 65B, and the pump 66 to increase/hold/decrease the fluid pressure of the wheel cylinders 89FL to 89RR.

In the present embodiment, a diagonal split type is used that separates the brake system between front left/rear right and front right/rear left, which is not a limiting example. A longitudinal split type may be used that separates the brake system between front left and right and rear left and right.

In the present embodiment, the spring-type accumulator 63 is used, which is not a limiting example. This may be any type such as a weight type, a gas compressing direct pressure type, a piston type a metal bellows type, a diaphragm type, a bladder type or an inline type as long as it can temporarily store brake fluid removed from the wheel cylinders 89FL to 89RR for decreased pressure.

The present embodiment is configured so that the first gate valves 61A, 61B and the inlet valves 62FL to 62RR at the deenergized normal positions open the channels and the outlet valves 64FL to 64RR and the second gate valves 65A, 65B at the deenergized state close the channel, which is not a limiting example. The first gate valves 61A, 61B and the inlet valves 62FL to 62RR at the energized offset positions may open the channel and the outlet valves 64FL to 64RR and the second gate valves 65A, 65B at the energized offset position may close the channel, as long as they can open/close the valves.

The brake controller 68 drives and controls a brake actuator normally in accordance with antiskid control, traction control and stability control, thus controlling fluid pressure of the wheel cylinders 89FL to 89RR. When receiving a driving command from a controller, the brake controller 68 gives a priority to the driving command to control driving of the brake actuator. For instance, receiving a driving command to increase the pressure at a predetermined wheel cylinder of four wheels, the brake controller increases normal target fluid pressure to control driving of the brake actuator. That is the description of the brake controller 86.

Figure 7:
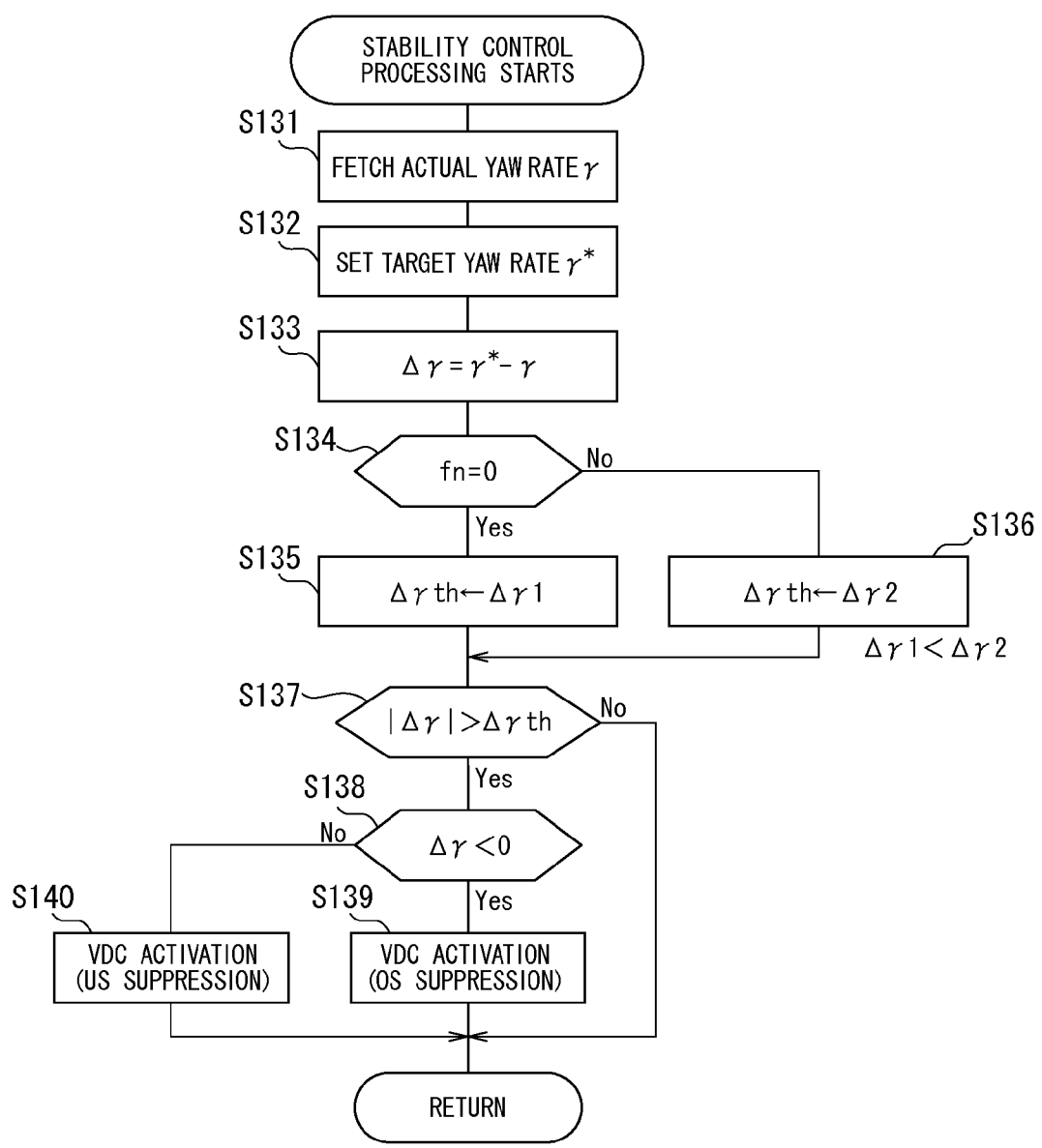
FIG. 7 is a flowchart illustrative of stability control processing.

Next, the following describes stability control processing executed by the VDC controller 81. FIG. 7 is a flowchart illustrative of stability control processing.

Firstly at Step S131, actual yaw rate (actual yaw rate) γ detected by the yaw rate sensor 83 is fetched.

At the subsequent Step S132, target yaw rate $\gamma^*$ of the vehicle is set in accordance with the vehicle velocity V and the steering angle $\theta s$.

At the subsequent Step S133, deviation $\Delta\gamma$ of the yaw rate is calculated by subtracting the actual yaw rate $\gamma$ from the target yaw rate $\gamma^*$.

At the subsequent Step S134, determination is made whether the detection flag is reset at fn=0 or not. When the result of the determination is fn=0, then it is determined that no neutral position displacement occurs, and the procedure proceeds to Step S135. On the other hand, when the result of the determination is fn=1, then it is determined that neutral position displacement occurs, and the procedure proceeds to Step S136.

At Step S135, a predetermined value $\Delta\gamma 1$ is set as a threshold value $\Delta\gamma$th for the yaw rate deviation $\Delta\gamma$, and the procedure proceeds to Step S137. The predetermined value $\Delta\gamma 1$ is a value to determine whether the vehicle is in a substantially neutral steer state and not having the oversteer tendency and the understeer tendency.

At Step S136, a predetermined value $\Delta\gamma 2$ is set as a threshold value $\Delta\gamma$th for the yaw rate deviation $\Delta\gamma$, where $\Delta\gamma 2$ is determined in a range larger than that of $\Delta\gamma 1$, and the procedure proceeds to Step S137. Since the predetermine $\Delta\gamma 2$ is set in a range larger than that of $\Delta\gamma 1$, it is more likely to determine the state as neutral steer. That is, it is less likely to determine as oversteer tendency or understeer tendency.

At Step S137, determination is made whether the absolute value of the yaw rate deviation $|\Delta\gamma|$ is larger than the threshold $\Delta\gamma$th or not. When the determination result is $|\Delta\gamma|\le\Delta\gamma$th, it is determined that the vehicle does not have oversteer tendency and understeer tendency, and is in a substantially neutral steer state. Then stability control (VDC function) is not activated, and then the procedure returns directly to the predetermined main program. On the other hand, when the determination result is $|\Delta\gamma|>\Delta\gamma$th, it is determined that the vehicle has oversteer tendency or understeer tendency, and then the procedure proceeds to Step S138.

At Step S138, determination is made whether the yaw rate deviation $\Delta\gamma$ is smaller than 0 or not. When the determination result is $\Delta\gamma<0$, it is determined that the actual yaw rate $\gamma$ is too much for the target yaw rate $\gamma^*$, i.e., the vehicle has oversteer (OS) tendency, and the procedure proceeds to Step S139. On the other hand, when the determination result is $\Delta\gamma>0$, it is determined that the actual yaw rate $\gamma$ is not enough for the target yaw rate $\gamma^*$, that is, the vehicle has understeer (US) tendency, and the procedure proceeds to Step S140.

At Step S139, in order to suppress the oversteer tendency of the vehicle, stability control (VDC function) is activated, and then the procedure returns to the predetermined main program. Specifically the engine output is suppressed, and brake is activated at longitudinal wheels on the turning outside, for example, to generate moment around the center axis to turn to the turning outside, thus suppressing oversteer tendency. The control amount of the engine and the control amount of the braking force are determined based on a difference between the yaw rate deviation $\Delta\gamma$ and the threshold $\Delta\gamma$th.

At Step S140, in order to suppress the understeer tendency of the vehicle, stability control (VDC function) is activated, and then the procedure returns to the predetermined main program. Specifically brake is activated at a rear wheel on the turning inside, for example, to generate moment around the center axis to turn to the turning inside, thus suppressing understeer tendency. The control amount of the braking force is determined based on a difference between the yaw rate deviation $\Delta\gamma$ and the threshold $\Delta\gamma$th. That is the stability control processing.

[Actions]

Next the following describes actions of Embodiment 1. The present embodiment is provided with the first turning motor M1 and the second turning motor M2 that can give driving force to turning output mechanism $St_{OUT}$, and these two motors execute the two-motor SBW mode that turns the wheels 13L and 13R. This can realize desired steering characteristics as a steering by wire function. Since the two motors turn the wheels 13L an 13R, the driving force required for the turning output mechanism $St_{OUT}$ can be shared. That is, increase in size of the motor can be suppressed and can have excellent layout property as compared with the configuration of turning the wheels 13L and 13R with one motor.

In the configuration of turning the wheels 13L and 13R with two motors, if one of the control systems generates abnormality, the other control system free from abnormality can be used. That is, as fail safe for the primary failure where only one of the control systems generates abnormality, the one-motor SBW mode or the one-motor EPS mode can be executed. In this way, if one of the control systems generates abnormality, the other control system free from abnormality is used, so that fail safe can be realized in which advantages from the two motors can be fully utilized. As fail safe for the secondary failure where the remaining control system also generates abnormality from the fail safe for the primary failure, manual steering mode can be executed. This can join the steering system physically and keep the direct steering operability.

After turning the ignition switch OFF, if steering manipulation is performed before the clutch 19 is actually engaged, the relationship between the steering angle $\theta s$ and the turning angle $\theta w$ changes, which may cause neutral position displacement. In this case, after turning the ignition switch ON, the relationship between the steering angle $\theta s$ and the turning angle $\theta w$ has to be corrected. However, since the vehicle travels straight ahead, for example, before the correction of the relationship between the steering angle $\theta s$ and the turning angle $\theta w$, the steering angle $\theta s$ may be larger than 0. This can lead to the risk of misoperation of the stability control to make the turning behavior of the vehicle agree with the target turning behavior.

Then, when the ignition switch is turned ON from OFF, firstly neutral position displacement detection processing is executed. Firstly, ending steering angle $\theta s(z)$ when the ignition switch is turned OFF from ON and starting steering angle $\theta s(n)$ when the ignition switch is turned ON from OFF are fetched (Step S101), and a difference $\Delta\theta s(=|\theta s(z)-\theta s(n)|)$ between the ending steering angle $\theta s(z)$ and the starting steering angle $\theta s(n)$ is calculated (Step S102). Then when the difference $\Delta\theta s$ is larger than a predetermined threshold $\theta 1$ (determined as "Yes" at Step S103), it is determined that the steering wheel 11 is moved and the neutral position displacement may occur, and the detection flag is set at fn=1 (Step S104).

The stability control detects actual yaw rate $\gamma$ (Step S131), and sets target yaw rate $\gamma^*$ from the vehicle velocity V and the steering angle $\theta s$ (Step S132). Deviation $\Delta\gamma$ of yaw rate is calculated between the target yaw rate $\gamma^*$ and the actual yaw rate $\gamma$ (Step S133). Then, when the absolute value of the yaw rate deviation $|\Delta\gamma|$ is $\Delta\gamma$th or less (determined as "No" at Step S137), stability control is not activated. On the other hand, when the absolute value of the yaw rate deviation $|\Delta\gamma|$ is more than $\Delta\gamma$th (determined as "Yes" at Step S137), stability control is activated.

Specifically when the yaw rate deviation $\Delta\gamma$ is less than 0 (determined as "Yes" at Step S138), since the vehicle has the oversteer (OS) tendency, the engine output is suppressed, and brake is activated at longitudinal wheels on the turning outside, for example, to generate moment around the center axis to turn to the turning outside, thus suppressing oversteer tendency (Step S139). On the other hand, when the yaw rate deviation Δγ is more than 0 (determined as "No" at Step S138), since the vehicle has the understeer (US) tendency, brake is activated at a rear wheel on the turning inside, for example, to generate moment around the center axis to turn to the turning inside, thus suppressing understeer tendency (Step S140).

At this time, when the detection flag is fn=0 (determined as "Yes" at Step S134), a normal threshold Δγth (=Δγ1) is set (Step S135). On the other hand, when the detection flag is fn=1 (determined as "No" at Step S134), a threshold γth (=Δγ2) larger than the normal Δγ1 is set (Step S136). That is, if neutral position displacement occurs, the threshold Δγth is made larger, to suppress the activation of the stability control. In this way, if neutral position displacement occurs, that is, in the state where the turning behavior of the vehicle and the target turning behavior cannot be compared appropriately, stability control is suppressed, whereby misoperation of the stability control resulting from neutral position displacement can be suppressed.

MODIFICATION EXAMPLES

In the present embodiment, yaw rate is used for turning behavior, which is not a limiting example. Instead, a vehicle body transverse slipping angle, for example, may be used for turning behavior. That is, transvers slipping angle is detected, and standard transverse angle is set based on the vehicle velocity V and the steering angle θs. Then if deviation between them is larger than a predetermined threshold, stability control may be activated.

In the present embodiment, two motors of the first turning motor M1 and the second turning motor M2 are provided to give a driving force to the turning output mechanism $St_{OUT}$, which is not a limiting example. Instead, only one motor may be provided. In this way, the number of motors to give a driving force of the turning output mechanism $St_{OUT}$ may be decreased, whereby the number of components can be reduced.

In the present embodiment, electric motors are used for the turning actuator and the reaction force actuator, which is not a limiting example. That is, any driving means such as a solenoid or a power cylinder may be used as long as it can give turning force to the turning output mechanism $St_{OUT}$ and turning force and reaction force to the steering input mechanism $St_{IN}$.

[Corresponding Relationship]

In the above description, the steering input mechanism $ST_{IN}$ corresponds to a "steering mechanism", the turning output mechanism $St_{OUT}$ corresponds to a "turning mechanism", the steering shaft 12 corresponds to an "input shaft", and the first pinion shaft 18 corresponds to an "output shaft". The first turning motor M1 and the second turning motor M2 correspond to a "turning actuator", and the first turning controller 71 and the second turning controller 72 corresponds to "steering control unit". The processing at Steps S133 to S140 corresponds to a "braking force control unit". The processing at Step S131 corresponds to a "turning behavior detection unit" and the processing at Step S132 corresponds to a "target turning behavior setting unit"

[Advantageous Effects]

Next the following describes advantageous effects from the major parts in Embodiment 1.

(1) The vehicle travel control apparatus of the present embodiment activates stability control so that actual yaw rate γ of the vehicle approaches target yaw rate γ*. The apparatus is then provided with the steering input mechanism $St_{IN}$ configured so that the steering shaft 12 rotates in accordance with the steering manipulation of the driver, the turning output mechanism $St_{OUT}$ configured so that wheels are turned with the rotation of the pinion shaft 18, and the clutch 19 configured to join the steering shaft 12 and the pinion shaft 18 disconnectably. The apparatus is provided with the first turning motor M1 and the second turning motor M2 that can give a turning force to the turning output mechanism $St_{OUT}$, and the first turning motor M1 and the second turning motor M2 are driven and controlled so that turning angle θw in accordance with the steering manipulation by the driver is realized while the clutch 19 is disconnected. Then, the state where the neutral position of the steering shaft 12 and the neutral position of the pinion shaft 18 are different is defined as neutral position displacement, and the stability control is suppressed if the neutral position displacement occurs.

In this way, if neutral position displacement occurs, that is, in the state where the turning behavior of the vehicle and the target turning behavior cannot be compared appropriately, stability control is suppressed, whereby misoperation of the stability control resulting from neutral position displacement can be suppressed.

(2) The vehicle travel control apparatus of the present embodiment detects actual yaw rate γ of the vehicle and sets target yaw rate γ* of the vehicle. Then, if deviation between the actual yaw rate γ and the target yaw rate γ* is larger than a predetermined threshold, stability control is activated. If neutral position displacement occurs, the threshold is set larger than that without neutral position displacement, so that stability control is suppressed. In this way, if neutral position displacement occurs, the threshold is set larger than that without neutral position displacement, so that stability control can be suppressed easily.

(3) The vehicle travel control apparatus of the present embodiment drives and controls the first turning motor M1 and the second turning motor M2 by steering-by-wire to cancel neutral position displacement, if any. In this way, the first turning motor M1 and the second turning motor M2 are driven and controlled to cancel the neutral position displacement, which does not leave the situation where the neutral position displacement occurs. That is, the procedure can return to normal stability control.

(4) The vehicle travel control apparatus of the present embodiment generates a braking force difference between at least left and right wheels so that the actual yaw rate γ of the vehicle approaches the target yaw rate γ*. In this way, based on the braking force difference between at least left and right wheels, the actual yaw rate γ of the vehicle can easily approach the target yaw rate γ*.

(5) If the ending steering angle θs(z) when the ignition switch is turned OFF from ON and the starting steering angle θs(n) when the ignition switch is firstly turned ON from OFF are different, the vehicle travel control apparatus of the present embodiment suppress the stability control until the steering controller cancels the neutral position displacement.

In this way, comparison between the ending steering angle θs(z) and the starting steering angle θs(n) enables the generation of neutral position displacement to be found easily and simply. That is, the activation of stability control can be suppressed rapidly.

(6) The vehicle travel control apparatus of the present embodiment drives and controls the first turning motor M1 and the second turning motor M2 by steering-by-wire to realize turning angle θw in accordance with the steering manipulation by the driver when the ignition switch is ON, and in the disconnected state of the clutch 19. When the ignition switch is OFF, the vehicle travel control apparatus stops driving and control of the first turning motor M1 and the second turning motor M2 in the engagement state of the clutch 19. In this way, when the ignition switch is OFF, the clutch 19 is engaged, whereby neutral position displacement can be minimized.

(7) A vehicle travel control method of the present embodiment activates stability control so that actual yaw rate γ of the vehicle approaches target yaw rate γ*. Between the steering input mechanism $St_{IN}$ configured so that the steering shaft 12 rotates in accordance with the steering manipulation of the driver and the turning output mechanism $St_{OUT}$ configured so that wheels are turned with the rotation of the pinion shaft 18, the clutch 19 is inserted, configured to join the steering shaft 12 and the pinion shaft 18 disconnectably. The first turning motor M1 and the second turning motor M2 are provided that can give a turning force to the turning output mechanism, and the first turning motor M1 and the second turning motor M2 are driven and controlled so that turning angle θw in accordance with the steering manipulation by the driver is realized while the clutch 19 is disconnected. Then, the state where the neutral position of the steering shaft 12 and the neutral position of the pinion shaft 18 are different is defined as neutral position displacement, and the stability control is suppressed if the neutral position displacement occurs.

In this way, if neutral position displacement occurs, that is, in the state where the turning behavior of the vehicle and the target turning behavior cannot be compared appropriately, stability control is suppressed, whereby misoperation of the stability control resulting from neutral position displacement can be suppressed.

The explanation has been made by way of the limited number of embodiment. The scope of the claims is not limited to the above, and various modifications of the disclosed embodiments will be apparent to those skilled in the art.

The invention claimed is:

1. A vehicle travel control apparatus comprising:
a turning behavior detection unit configured to detect turning behavior of a vehicle;
a target turning behavior setting unit configured to set target turning behavior of the vehicle;
a braking force control unit configured to, when deviation between turning behavior detected by the turning behavior detection unit and target turning behavior set by the target turning behavior setting unit is larger than a predetermined threshold, activate braking force control to control traveling in accordance with the deviation;
a steering mechanism configured to be steered by a driver;
a turning mechanism configured to turn a wheel;
a clutch configured to join the steering mechanism and the turning mechanism disconnectably;
a turning actuator configured to be capable of giving turning force to the turning mechanism;
a steering control unit configured to set a target turning angle of the wheel in accordance with steering manipulation by the driver in a state that the clutch is disconnected to control driving of the turning actuator in accordance with the target turning angle; and
a turning angle detection unit configured to detect turning angle of the wheel, wherein
when position displacement occurs so that the target turning angle and the turning angle are different, the braking force control unit sets the threshold larger than a threshold without the position displacement.

2. The vehicle travel control apparatus according to claim 1, wherein when the position displacement occurs, the steering control unit controls driving of the turning actuator to cancel the position displacement.

3. The vehicle travel control apparatus according to claim 1, wherein the braking force control unit generates a difference in braking force at least between left and right wheels in accordance with the deviation.

4. The vehicle travel control apparatus according to claim 1, wherein when steering angle of the steering mechanism when an ignition is turned OFF from ON and steering angle of the steering mechanism when the ignition is then turned ON from OFF firstly are different, the braking force control unit makes the threshold larger until the steering control unit cancels the position displacement.

5. The vehicle travel control apparatus according to claim 1, wherein
the steering control unit controls driving of the turning actuator in accordance with the target turning angle in the state of the clutch disconnected when the ignition is ON, and stops controlling driving of the turning actuator in the state of the clutch engaged when the ignition is OFF.

6. A vehicle travel control method that detects turning behavior of a vehicle, sets target turning behavior of the vehicle, and when deviation between the turning behavior and the target turning behavior is larger than a predetermined threshold, activates braking force control to control traveling in accordance with the deviation, comprising:
between a steering mechanism configured to be steered by a driver and a turning mechanism configured to turn a wheel, inserting a clutch configured to join the steering mechanism and the turning mechanism disconnectably;
providing a turning actuator configured to be capable of giving a turning force to the turning mechanism;
setting a target turning angle of the wheel in accordance with steering by the driver, and controlling driving of the turning actuator in accordance with the target turning angle;
detecting turning angle of the wheel; and
when position displacement occurs so that the target turning angle and the turning angle are different, setting the threshold to activate the braking force control larger than a threshold without the position displacement.

* * * * *